A. J. ORDAL.
NUT LOCK.
APPLICATION FILED APR. 29, 1919.
1,393,958. Patented Oct. 18, 1921.
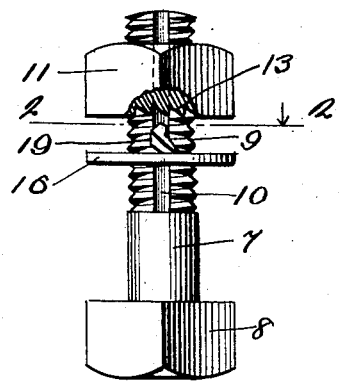
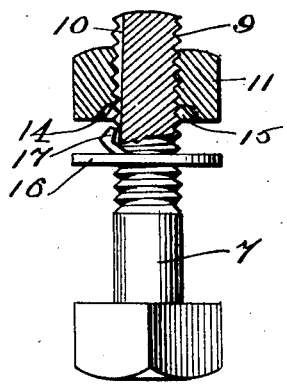
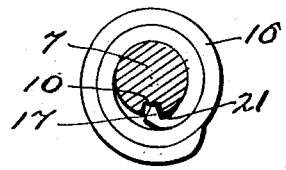
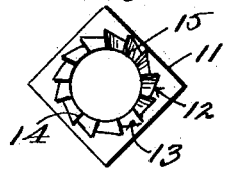
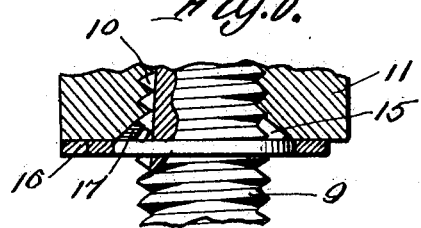
WITNESS:
INVENTOR.
ALBERT J. ORDAL
BY
ATTORNEY.

UNITED STATES PATENT OFFICE.

ALBERT J. ORDAL, OF COLTON, SOUTH DAKOTA.

NUT-LOCK.

1,393,958.  Specification of Letters Patent.  Patented Oct. 18, 1921.

Application filed April 29, 1919. Serial No. 293,412.

*To all whom it may concern:*

Be it known that I, ALBERT J. ORDAL, a citizen of the United States, residing at Colton, in the county of Minnehaha and State of South Dakota, have invented certain new and useful Improvements in Nut-Locks, of which the following is a specification.

My invention relates to new and useful improvements in nut locks and more particularly to that type employing means non-rotatable on the bolt for engagement with the nut whereby reverse rotation of the nut is prevented after it has been driven home.

An important object of the invention resides in the provision of a particularly formed locking element which embodies means for preventing rotation thereof and which means is adapted for engagement with the nut to prevent reverse rotation thereof.

Another object of my invention resides in the provision of a locking element and means carried by the nuts whereby a more severe binding engagement is made possible by the locking element acting upon the means provided in the nut.

A still further object of my invention resides in the provision of a locking element coöperating with notches in a nut, which locking element is so constructed that it will bite into the notches after the nut has been driven home.

A still further object of the invention resides in the provision of a bolt having a longitudinally extending groove therein, a spiral member having a particularly formed lip thereon which engages the groove in the bolt more securely after a nut having notches therein for coöperation with said lip has been driven home.

Other objects and advantages of the invention will become apparent during the course of the following description.

In the drawings, forming a part of the description and wherein like numerals are employed to designate like parts throughout the same, Figure 1 is a side elevation of the invention with a portion of the nut thereof broken away.

Fig. 2 is a transverse section of the same taken on the line 2—2 of Fig. 1.

Fig. 3 is a bottom plan of the notch.

Fig. 4 is a side elevation of the invention, the nut and free end of the bolt being shown in section.

Fig. 5 is a perspective view of the spiral member, and

Fig. 6 is an enlarged longitudinal section taken through the device when in a locked position.

In the drawings wherein for the purpose of illustration is shown a preferred embodiment of my invention, the numeral 7 indicates a bolt having a head 8 of any desired construction, and a threaded free end 9, which threaded portion is provided with a longitudinally extending groove 10 which extends the full length of the threads 9.

As more clearly illustrated in Figs. 3, 4 and 6, an ordinary nut 11 is provided with the usual threaded bore therethrough, and in the bottom of the nut I countersink the portion thereof surrounding the threaded bore as at 12. In reality, this countersink is provided by making a plurality of notches 13 in the bottom of the nut. These notches are formed by providing radially extending cuts 14 which converge from the bottom of the nut until they meet the threaded bore therethrough. The portions 15 of the notches which join the radially extending cuts of course incline to provide shoulders for the notches, and they also converge from the bottom of the nuts to the threaded bore therethrough, for a purpose which will hereinafter appear.

The locking member indicated in general by the numeral 16 is in the form of a spiral member, the free end of the inner spiral thereof being provided with an inwardly extending tongue 17 which is adapted for engagement with the longitudinally extending groove in the bolt. As more clearly shown in Fig. 5, this tongue tapers inwardly from its larger outer end to its smaller inner end. The tongue and adjacent portion 18 of the inner spiral are bent upwardly and twisted outwardly toward the side of the spiral member, whereby the tongue is inclined upwardly toward the nut. In order that the tongue may obtain a biting grip upon the notches 13 of the nut, the forward side 19 of the tongue is inclined rearwardly thereof whereby a sharp top forward edge 20 is provided. The inner edge 21 of the spiral adjacent the tongue, is cut away as more clearly shown in Fig. 2, so that the tongue may better engage the groove in the bolt when the nut is driven home.

By reason of the portions of the notches 13 converging from the bottom of the nut to the threaded bore therethrough and the inclined relation of the tongue 17, it will be evident that when the nut is rotated to be driven home and comes in engagement with the tongue 17, the tongue will be gradually forced into closer contact with the notches, and the inner end of the tongue 17 will be forced into closer engagement with the groove 10 in the bolt as the nut 11 is driven home. Also, the sharp edge 20 of the tongue will bite into the notches to obtain a more severe grip thereupon whereby the reverse rotation of the nut is prevented. as the nut moves inwardly upon the threaded portion of the bolt to engage with the tongue 17 and as the spiral member 16 is prevented from further inward movement upon the bolt, the tongue 17 is naturally forced closer to the body portion of the spiral member and by reason of its inclined relationship and the converging portions 15 of the notches, the tongue 17 will be forced inwardly into closer engagement with the groove 10 in the bolt. The inward movement of the tongue 17 will be permitted by reason of the portion 18 of the inner spiral being slightly cut away whereby this portion of the inner spiral may travel slightly inwardly toward the bolt. A suitable tool is inserted in the groove 10 to force the tongue 17 out of engagement with the notches 13 to remove the nut from the bolt.

The foregoing description and the drawings have reference to what may be considered the preferred, or approved, form of invention. It is to be understood that I may make such changes in construction and arrangement and combination of parts, materials, dimensions, etc., as may prove expedient and fall within the scope of the appended claims.

Having thus fully described my invention, what I claim as new and desire to secure by Letters Patent, is:

1. The combination with a bolt, and a nut having a recess therein the walls of which are inclined and provided with notches; of means for engagement with said recess and notches in the nut whereby said means is forced into binding engagement with the bolt when the nut is driven home.

2. The combination with a bolt, and a nut having an annular recess therein the walls of which are inclined to meet the bore of the nut and provided with notches; of a member having an inclined tongue for engagement with said recess and notches in the nut whereby said tongue is forced into binding engagement with the bolt when the nut is driven home.

3. The combination with a bolt, and a nut provided with a recess the walls of which are inclined and provided with notches; of a member having an inclined tongue for engagement with said recess and notches in the nut, and said member having its inner edge cut away adjacent said tongue to weaken said member adjacent the tongue whereby the latter is forced into binding engagement with the bolt and notches of the nut when the latter is driven home.

4. The combination with a bolt, and a nut having the bottom thereof provided with a recess meeting the threaded bore of the nut, said recess having inclined walls, said walls being provided with notches; of a spiral member having an inwardly extending tongue, and said tongue being inclined toward the bolt for engagement with said recess and notches whereby said tongue is forced into binding engagement with the bolt when the nut is driven home.

5. The combination with a bolt, and a nut having an annular recess therein, the walls of which are inclined and provided with notches; of a lock member and an inwardly extending tongue on said member adapted to engage said notches, said tongue being bent upwardly then twisted outwardly toward the side of the lock member to incline said tongue and the forward side of the tongue being inclined rearwardly to present a sharp upper edge on the tongue for engagement with the notches in the nut.

In testimony whereof I affix my signature in presence of two witnesses.

ALBERT J. ORDAL.

Witnesses:
N. A. MYKRE,
JOSEPH J. ORDAL.